(12) United States Patent
Pechanec et al.

(10) Patent No.: US 9,329,968 B2
(45) Date of Patent: May 3, 2016

(54) TESTING APPLICATION PERFORMANCE USING VIRTUAL MACHINES CREATED FROM THE SAME IMAGE ON DIFFERENT HARDWARE PLATFORMS

(75) Inventors: Jiri Pechanec, Raleigh, NC (US); Martin Vecera, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 276 days.

(21) Appl. No.: 13/220,246

(22) Filed: Aug. 29, 2011

(65) Prior Publication Data

US 2013/0055250 A1 Feb. 28, 2013

(51) Int. Cl.
G06F 9/455 (2006.01)
G06F 9/45 (2006.01)
G06F 11/34 (2006.01)

(52) U.S. Cl.
CPC ........ *G06F 11/3428* (2013.01); *G06F 9/45558* (2013.01); *G06F 2009/45591* (2013.01); *G06F 2201/815* (2013.01)

(58) Field of Classification Search
None
See application file for complete search history.

(56) References Cited

U.S. PATENT DOCUMENTS

| | | | | |
|---|---|---|---|---|
| 7,647,581 B2* | 1/2010 | Atkin et al. | | 717/118 |
| 7,769,864 B2* | 8/2010 | Gebhart et al. | | 709/226 |
| 2005/0120341 A1* | 6/2005 | Blumenthal et al. | | 717/158 |
| 2007/0204166 A1* | 8/2007 | Tome et al. | | 713/182 |
| 2010/0153617 A1* | 6/2010 | Miroshnichenko et al. | | 711/6 |
| 2010/0223610 A1* | 9/2010 | Dehaan et al. | | 717/178 |
| 2011/0191402 A1* | 8/2011 | Imai | | 709/201 |
| 2011/0219372 A1* | 9/2011 | Agrawal et al. | | 718/1 |
| 2012/0180041 A1* | 7/2012 | Fletcher | | 718/1 |
| 2012/0311128 A1* | 12/2012 | Pechanec et al. | | 709/224 |
| 2012/0324445 A1* | 12/2012 | Dow et al. | | 718/1 |

OTHER PUBLICATIONS

Anonymous. "VMware VMmark 2.x, Measure Performance with the Industry's First Virtualization Platform Benchmark,", 4 pages, Jul. 31, 2007.

* cited by examiner

*Primary Examiner* — Meng An
*Assistant Examiner* — Bradley Teets
(74) *Attorney, Agent, or Firm* — Lowenstein Sandler LLP (57) ABSTRACT

A virtual benchmarking module generates a first virtual machine and a second virtual machine from a preconfigured image of a computing system. The virtual benchmarking module runs the first virtual machine on a first hardware platform and causes a benchmark program to be executed on the first virtual machine to measure a performance level of a first computer application program. The virtual benchmarking module runs the second virtual machine on a second hardware platform and causes the benchmark program to be executed on the second virtual machine to measure a performance level of a second computer application program. The virtual benchmarking module compares the performance levels of the first and second computer application programs, where the virtual machines counteract an effect of a difference between the first and second hardware platforms on the performance levels.

12 Claims, 9 Drawing Sheets

TESTING APPLICATION PERFORMANCE USING VIRTUAL MACHINES CREATED FROM THE SAME IMAGE ON DIFFERENT HARDWARE PLATFORMS

TECHNICAL FIELD

This disclosure relates to the field of performance testing and, in particular, to performance benchmarking in virtual machines.

BACKGROUND

In computing, benchmarking is the act of running a computer program, a set of programs, or other operations, in order to assess the relative performance of an application or program, normally by running a number of standard tests and trials against it. The term benchmark may also be used to describe specially-designed benchmarking programs themselves.

Benchmarking may often be associated with assessing performance characteristics of computer hardware, for example, the computational performance of a processing device. There are, however, circumstances where the technique is also applicable to software. Software benchmarks are run against computer applications or programs, such as compilers, middleware, database management systems, etc. to asses their performance. A benchmark may be designed to mimic a particular type of workload on a piece of software under certain conditions. Thus, benchmarks provide a method of comparing the performance of various programs across different system architectures or configurations.

In some cases, the results of a benchmark are compared for software provided by different vendors to compare their performance. Identifying one product that performs better than another provides many advantages. However, the results of a benchmark may be affected by other factors than just the particular piece of software being tested. Any variation in the physical hardware used to run the benchmark, the configuration or optimization of the system (e.g., the operating system), or the configuration of any resources used by the application under test (e.g., a database) may affect the results of the benchmark. For example if one benchmark is performed for a program from a first vendor on a machine with a much faster processing device, it may appear that the performance of that program is superior, when the performance increase is really attributable to the processing device. If the benchmarks for different pieces of software are run at different times, in different locations, on different machines, or by different testers, it may be difficult, if not impossible, to replicate the same conditions for each benchmark. This may lead to inconsistent results that do not accurately compare the relative performance of different software applications or programs.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments are described for performance benchmarking in virtual machines. In one embodiment, a virtual benchmarking module generates a first virtual machine and a second virtual machine from a preconfigured image of a computing system. The virtual benchmarking module runs the first virtual machine on a first hardware platform and causes a benchmark program to be executed on the first virtual machine to measure a performance level of a first computer application program. The virtual benchmarking module runs the second virtual machine on a second hardware platform and causes the benchmark program to be executed on the second virtual machine to measure a performance level of a second computer application program. The virtual benchmarking module compares the performance levels of the first and second computer application programs, where the virtual machines counteract an effect of a difference between the first and second hardware platforms on the performance levels.

The techniques for performance benchmarking in virtual machines described herein allow for reliable testing of the performance of computer application programs across a variety of hardware platforms. Since a virtual machine based on the preconfigured image is used to execute the benchmark program, an identical virtual computing environment is presented regardless of differences between the hardware platform of the host machine(s). The identical configuration of the virtual machine(s) may counteract any effect that differences between the hardware platforms of the host machines may have on the performance levels of an application under test. Thus, any differences in the performance levels may be attributed solely to the applications themselves, rather than the underlying hardware or configuration, which allows for a more reliable and true comparison.

Figure 1:
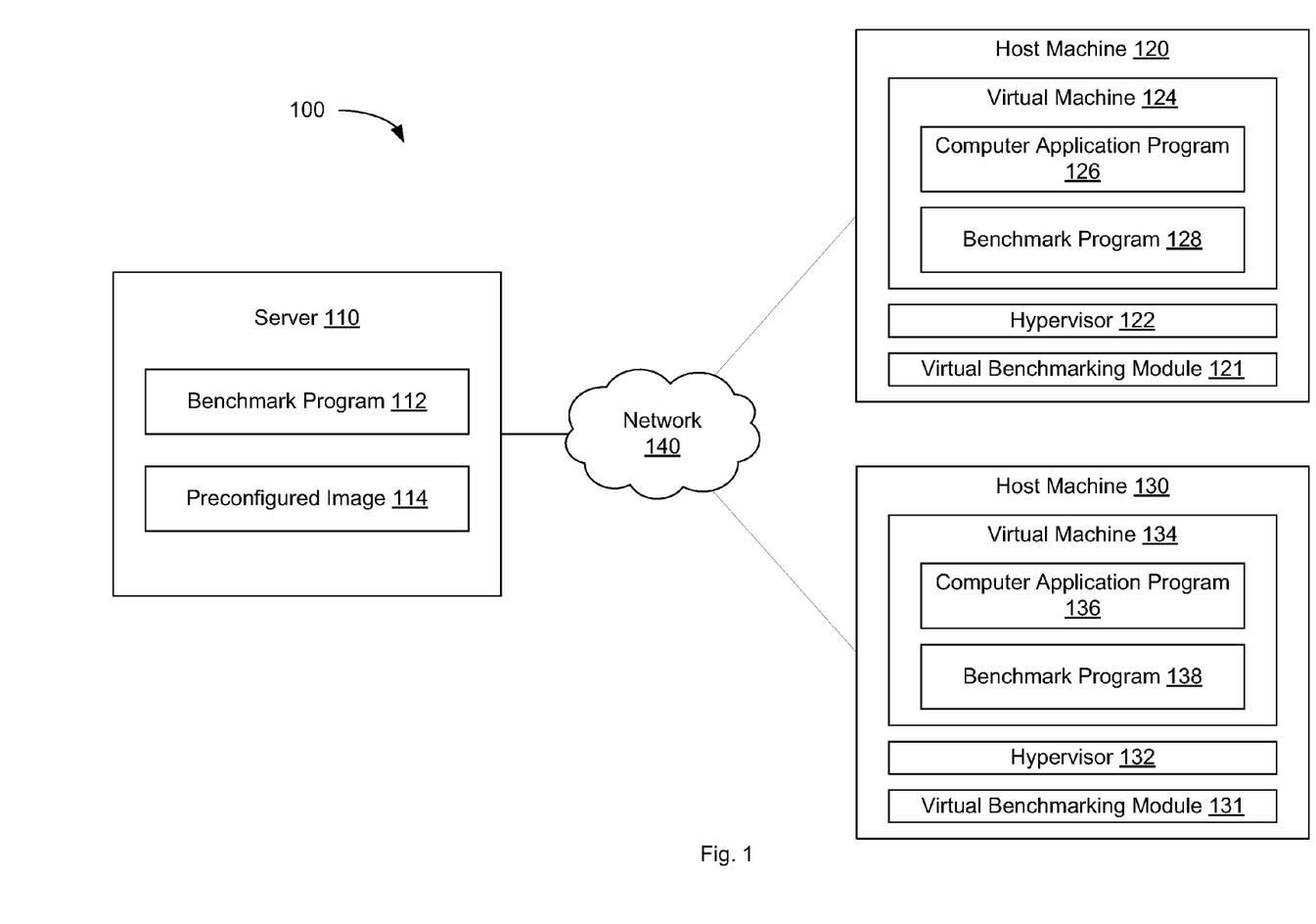
FIG. 1 is a block diagram illustrating a computing environment for performance benchmarking in virtual machines, according to an embodiment.

FIG. 1 is a block diagram illustrating a computing environment for performance benchmarking in virtual machines, according to an embodiment of the present invention. In one embodiment, network environment 100 includes server 110, and host machines 120, 130. Server 110 and host machines 120, 130 may be computing devices, such as computing device 600, described below with respect to FIG. 6. Host machines 120, 130 may be any type of computing device, such as a server, personal computer, workstation, mobile computing device or other device. Host machines 120, 130 may be connected to server 110 through a network 140, which may be, for example, a local area network (LAN), a wide area network (WAN), a global area network (GAN) such as the Internet, or a combination of such networks. In another embodiment, each of host machines 120, 130 may have a direct connection to server 110. The illustrated embodiment shows one server 110 and two host machines 120, 130, however, in other embodiments, there may be any number of servers or host machines, and environment 100 may include additional and/or different devices.

In one embodiment, server 110 may include benchmark program 112 and preconfigured image 114. Benchmark program 112 may be a computer application program designed to assess the relative performance of another application or program by running a number of standard tests and trials. Benchmark program 112 may mimic a workload on the application under test under certain conditions so that the performance of the application may be measured. Preconfigured image 114 may be copy of a computing system in a particular state. Preconfigured image 114 may include virtual computer hardware components (i.e., processing device, memory, etc.), a guest operating system, and one or more system resources that may be used by the application under test. The components of preconfigured image 114 may be configured according to certain preset parameters. In one embodiment, server 110 may be managed by, and benchmark program 112 and preconfigured image 114 may be provided by, a single vendor which represents an industry standard for software testing. That is, benchmark program 112 and preconfigured image 114 may be used throughout the industry to test the performance of certain types of computer application programs.

In one embodiment, host machines 120, 130 include virtual benchmarking modules 121, 131, hypervisors 122, 132, and virtual machines 124, 134. In one embodiment host machines 120, 130 may be different physical machines, however, in another embodiment, host machines 120, 130 may represent different hardware platforms of the same physical machine. That is, changes may be made to the configuration of the hardware components in the host machine resulting in different hardware platforms. In addition, changes may be made over time, such as the addition, removal, upgrade, etc. of certain hardware components in the host machine, such that host machines 120, 130 represent the hardware platform of one physical machine at different points in time.

In one embodiment, the virtual benchmarking module 121, 131 in each of host machines 120, 130 receives benchmark program 112 and preconfigured image 114 from server 110 over network 140. In one embodiment, in response to a request (e.g., from a user or another software process), virtual benchmarking module 121, 131 may instruct hypervisor 122, 132 to launch a virtual machine 124, 134. Hypervisor 122, 132 generates a virtual operating platform based, for example, on preconfigured image 114 and manages the operation of virtual machine 124, 134. Virtual machine 124, 134 may include the virtual hardware, guest operating system and system resources of preconfigured image 114. Since both virtual machines 124, 134 are based on preconfigured image 114, in one embodiment, both virtual machines 124, 134 are identical providing a same virtual computing environment regardless of differences between the hardware platform of host machine 120, 130 on which they are operating. The identical configurations of virtual machines 124, 134 may counteract any effect that differences between the hardware platforms of host machines 120, 130 may have on the performance levels of an application under test. In one embodiment, virtual machines 124, 134 may be Java virtual machines (JVMs) capable of executing Java bytecode.

Virtual benchmarking modules 121, 131 may launch virtual machines 124, 134 and run benchmark programs 128, 138 in virtual machines 124, 134. Benchmark programs 128, 138 may be designed to assess the performance of applications under test, such as computer application programs 126, 136. In one embodiment benchmark programs 128, 138 may be copies of benchmark program 112 downloaded from server 110 over network 140. In one embodiment, computer application programs 126, 136 may be any type of software programs designed to perform a specific task. Computer application programs 126, 136 may be programs designed to perform the same or a similar task, so that a comparison of their performance levels will be meaningful to a tester or consumer. Computer application programs 126, 136 may be competing products provided, for example, by different vendors. In other embodiments, however, computer application programs 126, 136 may be designed to perform different tasks and/or may be provided by the same software vendor. In one embodiment, the computer application programs 126, 136 to be tested by benchmark programs 128, 138 may be specified by a user (e.g., through a user interface provided by virtual benchmarking module 121).

Benchmark programs 128, 138 may perform one or more benchmark tests on computer application programs 126, 136 to measure their performance. For example, benchmark programs 128, 138 may simulate a workload provided to computer application programs 126, 136 and measure a number of transactions performed in a given period of time (e.g., transactions per second). This may represent the relative performance level of the computer application programs 126, 136. For example, if computer application programs 126, 136 are database management software programs designed to read and write entries in a database, benchmark programs 128, 138 may make a number of data access requests to a database (not shown, but provided as a system resource in preconfigured image 114 and virtual machines 124, 134). The resulting performance of each of computer application programs 126, 136 in responding to those data access requests may be measured. Since both of computer application programs 126, 136 are operated within identical virtual machines 124, 134, their relative performance levels may be directly compared without being affected by the hardware platform or configuration of the host machines 120, 130 on which they are running.

Figure 2:
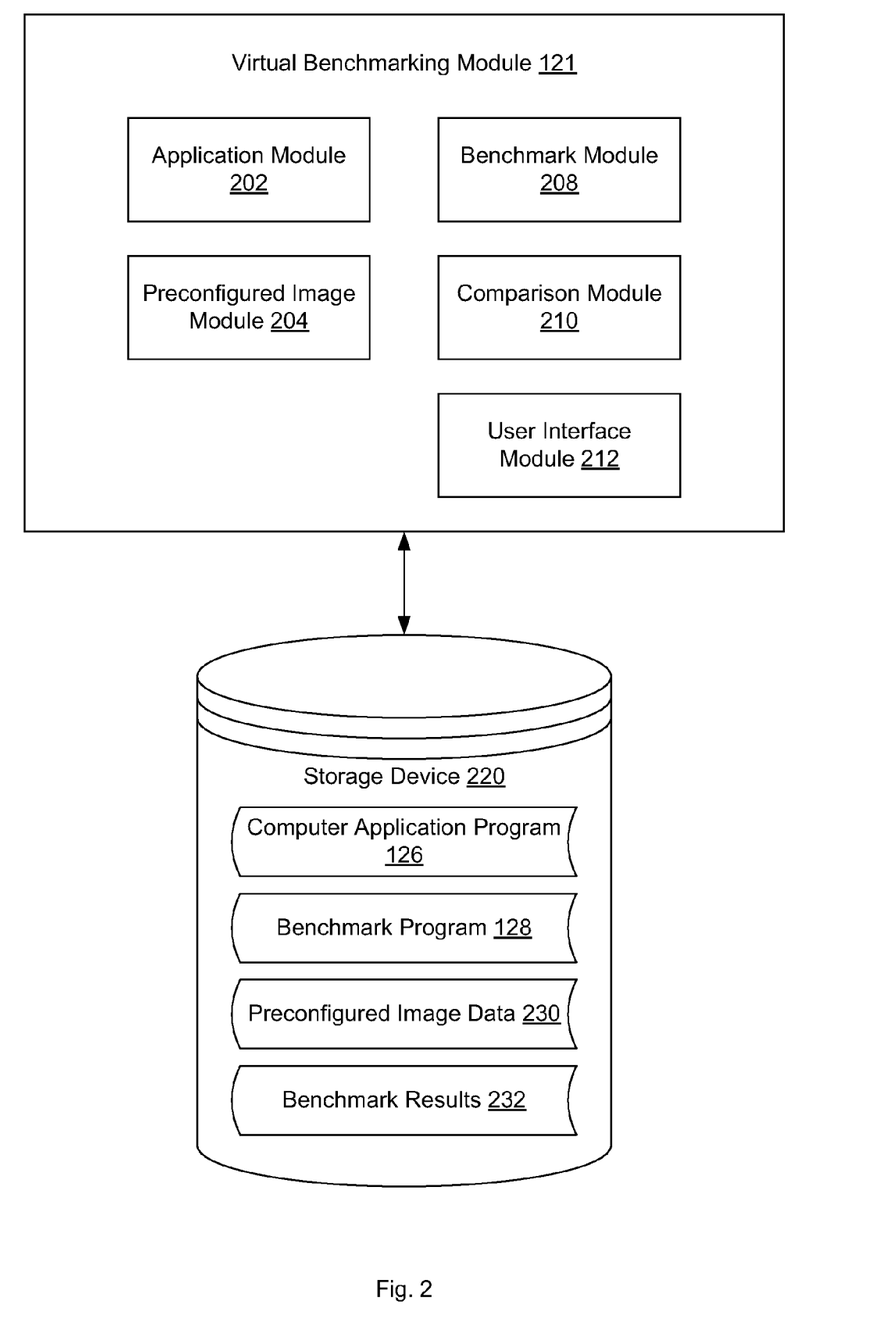
FIG. 2 is a block diagram illustrating a virtual benchmarking module, according to an embodiment.

FIG. 2 is a block diagram illustrating a virtual benchmarking module, according to an embodiment of the present invention. In one embodiment, virtual benchmarking module 121 runs on host machine 120, as shown in FIG. 1. In one embodiment, virtual benchmarking module 121 includes application module 202, preconfigured image module 204, benchmark module 208, comparison module 210 and user interface module 212. Virtual benchmarking module 121 may be coupled to a storage device 220 which includes computer application program 126, benchmark program 128, preconfigured image data 230 and benchmark results 232. Storage device 220 may include mass storage devices which can include, for example, flash memory, magnetic or optical disks, or tape drives, read-only memory (ROM); random-access memory (RAM); erasable programmable memory (e.g., EPROM and EEPROM); flash memory; or any other type of storage medium. Virtual benchmarking module 121 may be representative of virtual benchmarking modules 121, 131 described above with respect to FIG. 1.

Figure 3A:
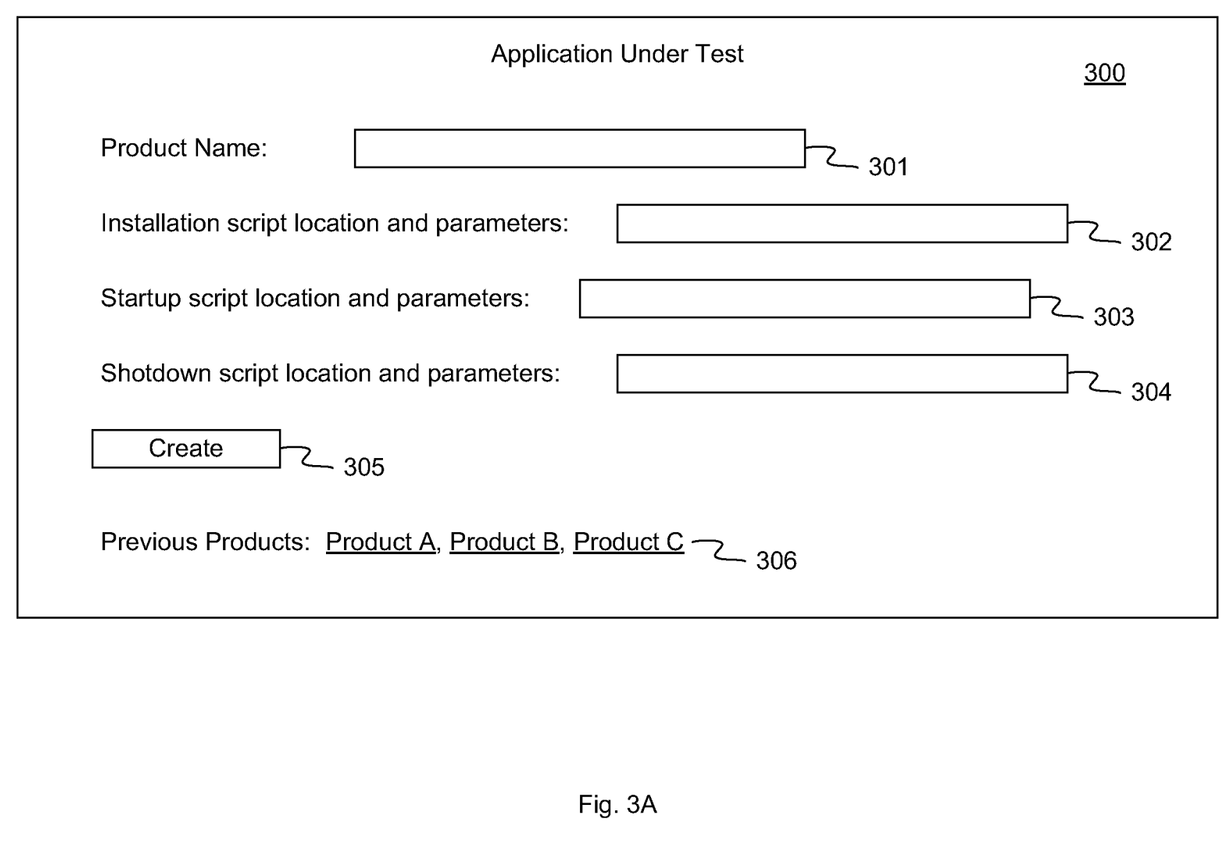
FIGS. 3A-3D are block diagrams illustrating user interfaces provided for performance benchmarking in virtual machines, according to an embodiment.

Application module 202 may receive an indication of a computer application program, such as computer application program 126 from storage device 220, that is to be tested by benchmark program 128. In one embodiment, the computer application program may be selected by a user through a user interface provided by user interface module 212. One example of such as user interface is shown in FIG. 3A. In FIG. 3A, user interface 300 may allow a user to select and/or configure an application under test. The user may input information into fields such as Product name 301, Installation script location and parameters 302, Startup script location and parameters 303, and Shotdown script location and parameters 304 and enter the selection through Create command 305. In addition, the user may select a computer application program from a list of previously used products 306. The data input to user interface 300 may be received by application module 202.

Figure 3B:
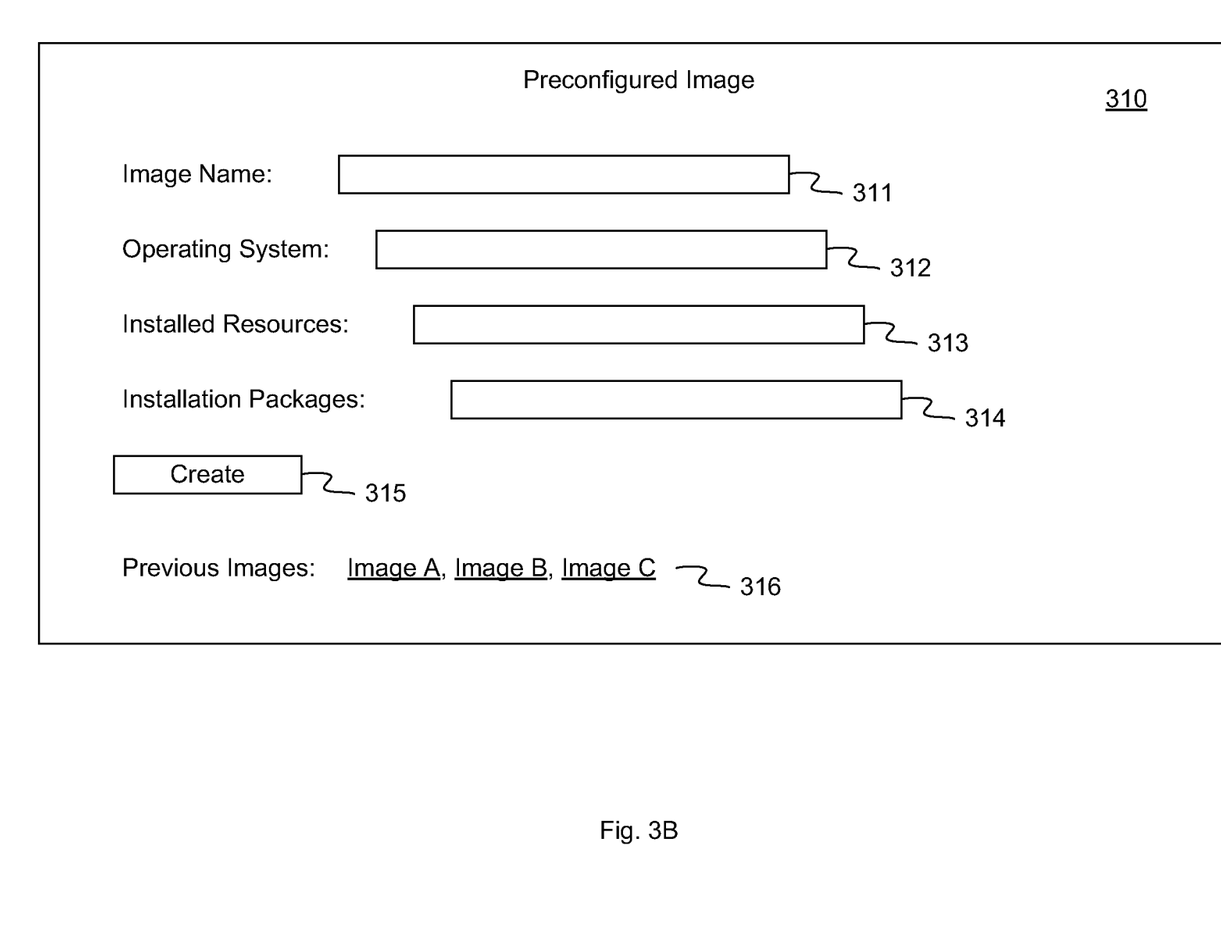

Preconfigured image module 204 may receive an indication of a preconfigured image, such as preconfigured image 114, or configuration data to create a new image and store that data as preconfigured image data 230 in storage device 220. In one embodiment, the preconfigured image may be selected and/or configured by a user through a user interface provided by user interface module 212. One example of such a user interface is shown in FIG. 3B. In FIG. 3B, user interface 310 may allow a user to select and/or configure an image. The user may input information into fields such as Image name 311, Operating system 312, Installed resources 313, and Installation packages 314 and enter the selection through Create command 315. In addition, the user may select an image from a list of previously used images 316. The data input to user interface 310 may be received by preconfigured image module 204 and stored in storage device 220 as preconfigured image data 230. A hypervisor, such as hypervisor 122 of FIG. 1, may create a virtual machine 124 using preconfigured image data 230.

Figure 3C:
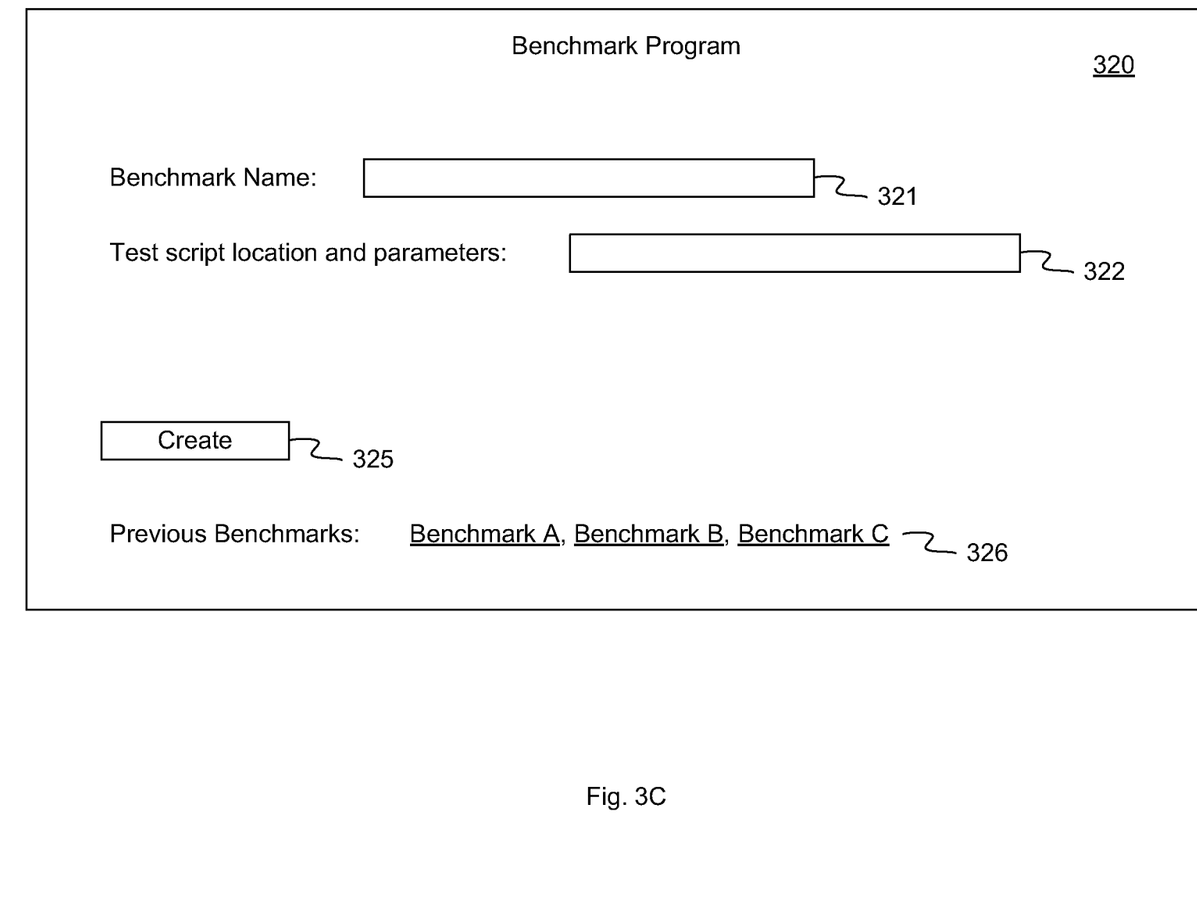

Benchmark module 208 may receive an indication of benchmark program, such as benchmark program 128 from storage device 220, that is used to test computer application program 126. In one embodiment, the benchmark program may be selected by a user through a user interface provided by user interface module 212. One example of such as user interface is shown in FIG. 3C. In FIG. 3C, user interface 320 may allow a user to select and/or configure a benchmark program. The user may input information into fields such as Benchmark name 321 and Test script location and parameters 322 and enter the selection through Create command 325. In addition, the user may select a benchmark program from a list of previously used benchmarks 326. The data input to user interface 320 may be received by benchmark module 208. The benchmark program 128 may be used to test the performance of one or more computer application programs, such as computer application program 126, as described below.

Figure 3D:
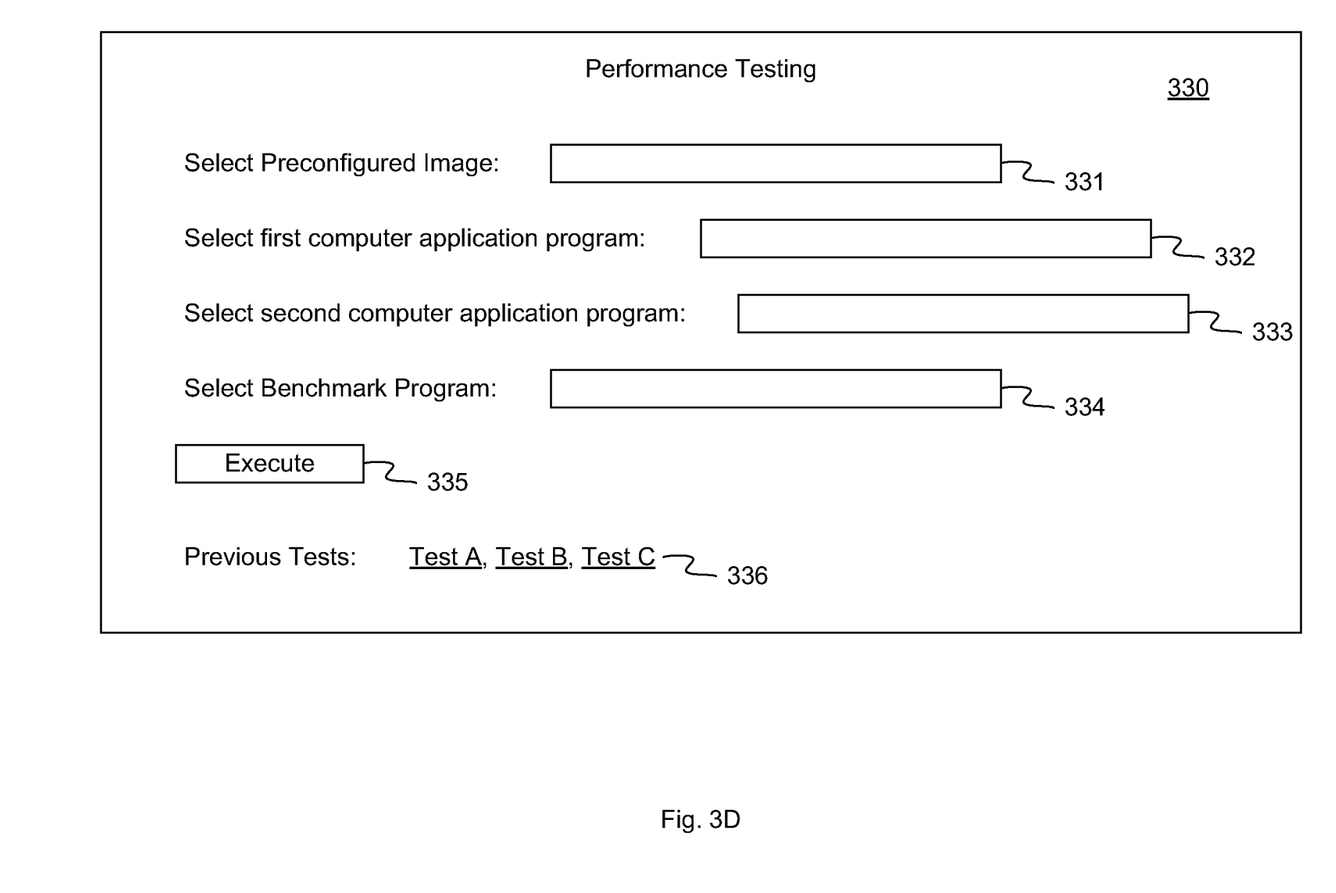

User interface module 212 may provide an additional user interface to a user, as shown in FIG. 3D. In FIG. 3D, user interface 330 may allow a user to select one or more computer application programs 126 to be tested by benchmark program 128 in a virtual machine based on preconfigured image data 230. The user may input information into fields such as preconfigured image 331, first computer application program 332, second computer application program 333, and benchmark program 334 and enter the selection through Execute command 335. In addition, the user may select a test configuration from a list of previous tests 336. In response to the data input to user interface 330, virtual benchmarking module 121 may instruct hypervisor 122 to create the virtual machine 124, run benchmark program 128 on the specified computer application programs, and record the results as benchmark results 232. The results may represent a performance level of the computer application programs. Comparison module 210 of virtual benchmarking module 121 may compare the results 232 for each computer application program 126 and provide a result of the comparison to a user in a user interface provided by user interface module 212.

Figure 4:
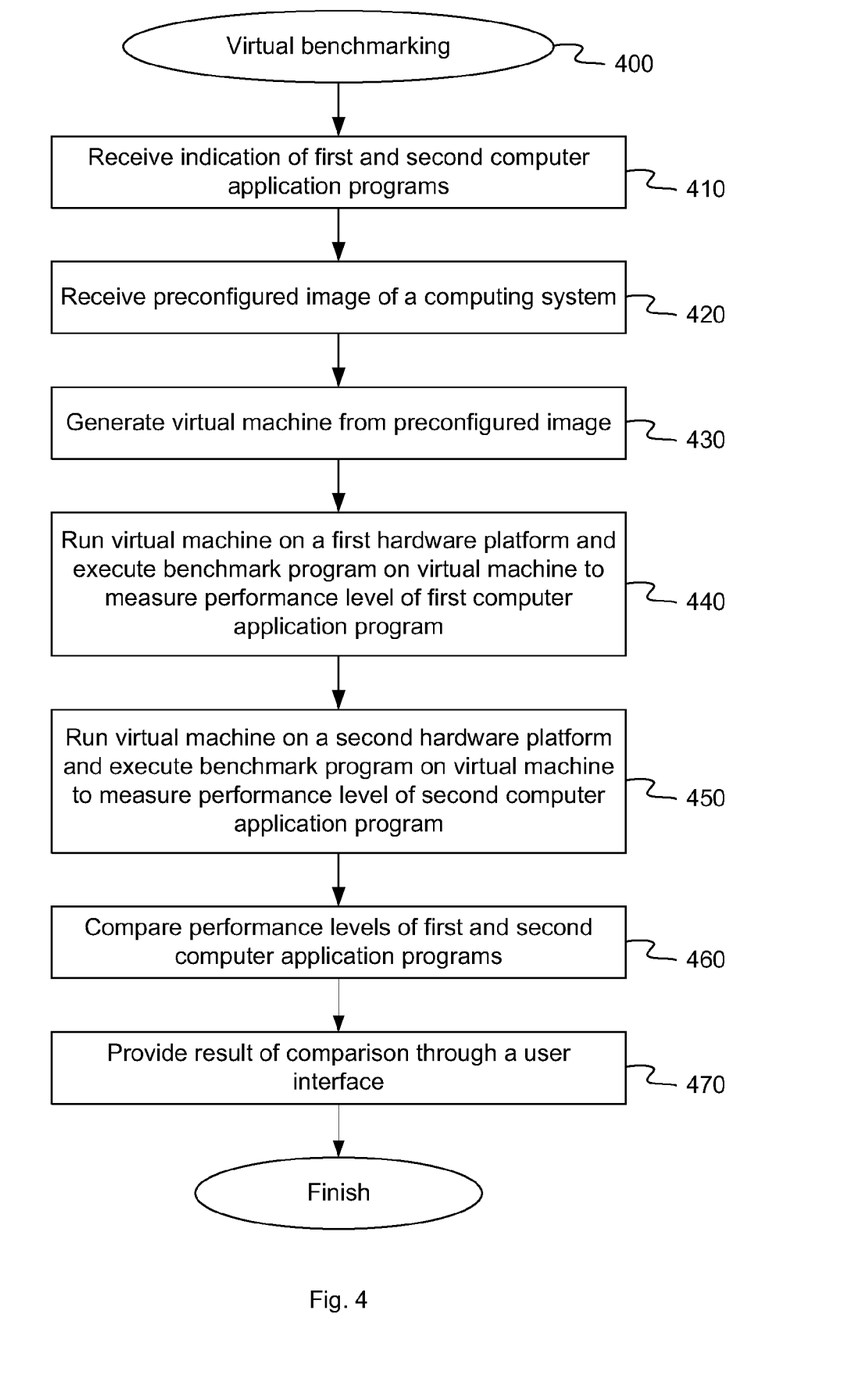
FIG. 4 is a flow diagram illustrating a virtual benchmarking method, according to an embodiment.

FIG. 4 is a flow diagram illustrating virtual benchmarking method, according to an embodiment of the present invention. The method 400 may be performed by processing logic that comprises hardware (e.g., circuitry, dedicated logic, programmable logic, microcode, etc.), software (e.g., instructions run on a processing device to perform hardware simulation), or a combination thereof. The processing logic is configured to execute a benchmark program on a virtual machine to measure a performance level of a computer application program so that the virtual machine counteracts an effect of the hardware platform on the performance level of the application. In one embodiment, method 400 may be performed by virtual benchmarking module 121, 131, as shown in FIGS. 1 and 2.

Referring to FIG. 4, at block 410, method 400 receives an indication of a first and second computer application programs. In one embodiment, the applications may be computer application programs 126, 136 of FIG. 1. The indication may be provided by a user (e.g., through a user interface) or other software process. The indication may indicate two software programs that the user wishes to compare performance levels of using a benchmark program 112. At block 420, method 400 receives a preconfigured image 114 of a computing system. In one embodiment, the preconfigured image 114 may be a copy of a state of an actual computing system and include virtual computer hardware components (i.e., processing device, memory, etc.), a guest operating system, and one or more system resources that may be used by the application under test. In other embodiments however, preconfigured image 114 may not be related to any actual system and instead may be constructed from an array of any available components configured as desired by the user. The preconfigured image 114 may be used to generate a virtual machine 124, 134 on which to execute the benchmark program.

At block 430, method 400 generates a virtual machine 124, 134 from the preconfigured image 114. The virtual machine 124, 134 may be generated on a host machine 120, 130 having a particular hardware platform or configuration. Since both virtual machines 124, 134 are based on preconfigured image 114, in one embodiment, both virtual machines 124, 134 are identical providing a same virtual computing environment regardless of differences between the hardware platform of host machines 120, 130 on which they are operating. The virtual machine 124, 134 may include the virtual computer hardware components (i.e., processing device, memory, etc.), guest operating system, and system resources of the preconfigured image 114.

At block 440, method 400 runs virtual machine 124 on a first hardware platform (e.g., host machine 120) and executes benchmark program 128 on virtual machine 124 to measure a performance level of a first computer application program 126. Virtual benchmarking module 121 may execute one or more tests contained in benchmark program 128 to apply a workload on computer application program 126 and measure the resulting performance.

At block 450, method 400 runs virtual machine 134 on a second hardware platform (e.g., host machine 130) and executes benchmark program 138 on virtual machine 134 to measure a performance level of a second computer application program 136. Virtual benchmarking module 131 may execute one or more tests contained in benchmark program 138 to apply a workload on computer application program 136 and measure the resulting performance. In one embodiment, the first and second hardware platforms may include different components and/or configurations, however, the identical configuration of virtual machines 124, 134 may counteract any effect that differences between the hardware platforms of host machines 120, 130 may have on the performance levels of applications 126, 136. In one embodiment, benchmark programs 128, 138 are executed sequentially in time on the same virtual machine, however in other embodiments, benchmark programs 128, 138 may be executed in parallel on different virtual machines.

At block 460, method 400 compares performance levels of the first and second computer application programs 126, 136. Comparing the performance levels may include, for example, determining which application 126, 136 has a higher (or lower) performance level (e.g., transactions per second), whether the performance levels are the same, a difference between the performance levels (e.g., in total, or as a percentage difference), or other comparison. At block 470, method 400 provides a result of the comparison to a user through a user interface. In one embodiment, method 400 also includes the individual results of the benchmark program 128, 138 for applications 126, 136. In another embodiment, rather than (or in addition to) providing the results to a user through a user interface, method 400 provides the results to another software program or process.

Figure 5:
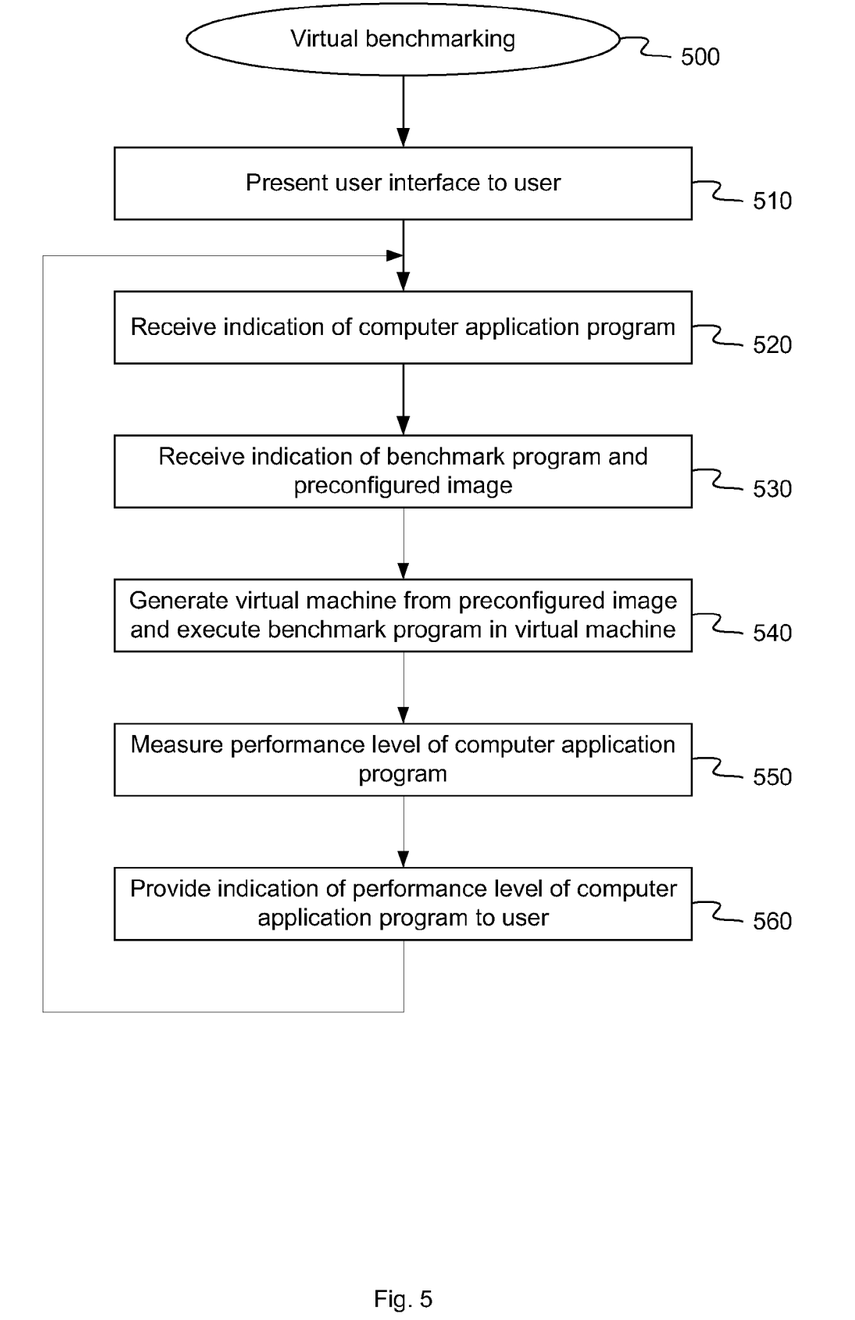
FIG. 5 is a flow diagram illustrating a virtual benchmarking method, according to an embodiment.

FIG. 5 is a flow diagram illustrating a virtual benchmarking method, according to an embodiment of the present invention. The method 500 may be performed by processing logic that is configured to measure performance levels of two or more computer application programs with minimal user effort without being affected by differences in the hardware platforms. In one embodiment, method 500 may be performed by virtual benchmarking module 121, 131, as shown in FIGS. 1 and 2.

Referring to FIG. 5, at block 510, method 500 presents a user interface to a user. The user interface may include one or more fields to allow the user to select or input various parameters for the virtual benchmarking process. At block 520, method 500 receives an indication of a computer application program. The user, through the user interface, may specify the name or location of an application that will be tested by the virtual benchmarking process. At block 530, method 500 receives an indication of a benchmark program and preconfigured image. The user, through the user interface, may specify the name or location of the benchmark program and the preconfigured image. In one embodiment, the benchmark program 112 and preconfigured image 114 may be downloaded to host machine 120 from server 110 over network 140.

At block 540, method 500 generates a virtual machine 124 from the preconfigured image 114 and executes the benchmark program 128 in the virtual machine 124. Virtual benchmarking module 121 may execute one or more tests contained in benchmark program 128 to apply a workload on computer application program 126. At block 550, method 500 measures a performance level of the computer application program 126. For example, virtual benchmarking module 121 may measure a number of transaction performed in a certain period of time by application 126 in response to the workload.

At block 560, method 500 provides an indication of the performance level of the computer application program 126 measured at block 550. In one embodiment, the indication is provided to a user through the user interface. Method 500 may return to block 520 and repeat the actions of blocks 520-560 for any remaining computer application programs. Since the same virtual machine is used to run the benchmark program for each different computer application program any effect that differences between the hardware platforms of the physical machines running the virtual machine may have on the performance levels of the application is eliminated.

Figure 6:
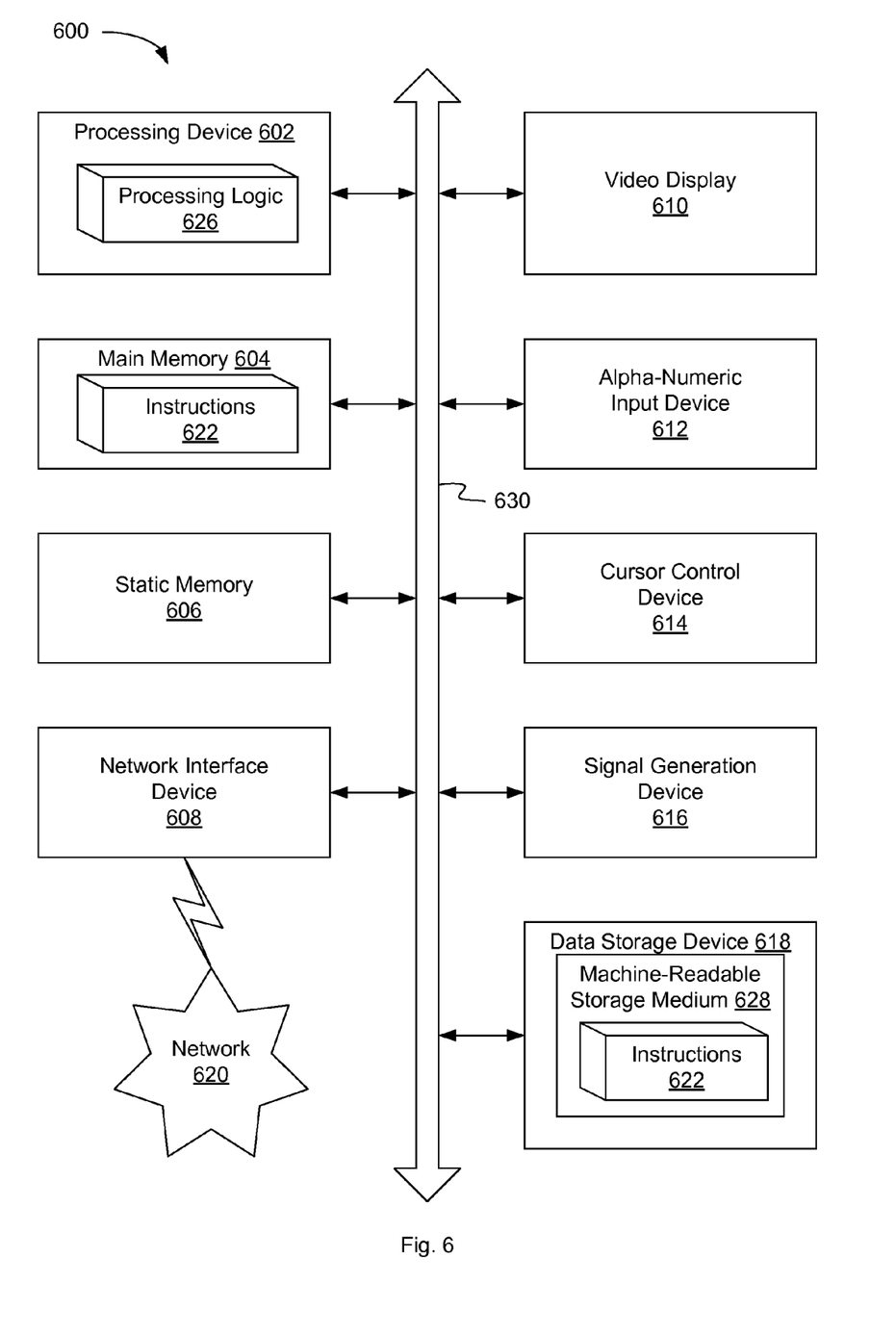
FIG. 6 is a block diagram illustrating one embodiment of a computer system, according to an embodiment.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may be representative of a server, such as server 110, or of a host machine, such as host machines 120, 130 running virtual benchmarking modules 121, 131 in FIG. 1.

The exemplary computer system 600 includes a processing device 602, a main memory 604 (e.g., read-only memory (ROM), flash memory, dynamic random access memory (DRAM) (such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 628, on which is stored one or more set of instructions 622 (e.g., software) embodying any one or more of the methodologies of functions described herein. The instructions 622 may also reside, completely or at least partially, within the main memory 604 and/or within the processing device 602 during execution thereof by the computer system 600; the main memory 604 and the processing device 602 also constituting machine-accessible storage media. The instructions 622 may further be transmitted or received over a network 620 via the network interface device 608.

The machine-readable storage medium 628 may also be used to store instructions to perform a method for performance benchmarking using virtual machines, as described herein. While the machine-readable storage medium 628 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

What is claimed is:

1. A method, comprising:
   generating, by a processing device, a first virtual machine from an image of a computing system;
   generating, by the processing device, a second virtual machine from the image of the computing system;
   executing a benchmark program on the first virtual machine to measure a performance level of a first computer application program, the first virtual machine to run on a first hardware platform, wherein the benchmark program and the image of the computing system are provided by a same entity, and wherein the image of the computing system comprises virtual computer hardware and a guest operating system used by the first computer application program;
   executing the benchmark program on the second virtual machine to measure a performance level of a second computer application program, the second virtual machine to run on a second hardware platform having a different configuration of hardware components than the first hardware platform, the different configuration resulting in a variation in computing performance between the first and second hardware platforms, and wherein the benchmark program is executed on the first and second virtual machines to simulate a workload on the first and second computer application programs and to measure the performance levels of the first and second computer application programs in response to the workload in parallel;
   comparing the performance levels of the first and second computer application programs, wherein an effect of the variation in computing performance between the first and second hardware platforms on the performance levels of the first and second computer application programs is reduced by the first and second virtual machines; and
   providing a result of the comparing through a user interface, the result to indicate the performance levels of the first and second computer application programs.

2. The method of claim 1, wherein the first and second computer application programs are provided by different entities.

3. The method of claim 1, wherein the performance is measured by a number of transactions performed in a given period of time.

4. The method of claim 1, wherein the workload is applied to the first and second computer application programs sequentially.

5. A system comprising:
   a memory; and
   a processing device, coupled to the memory, the processing device to:
     generate a first virtual machine from an image of a computing system;
     generate a second virtual machine from the image of the computing system;
     execute a benchmark program on the first virtual machine to measure a performance level of a first computer application program, the first virtual machine to run on a first hardware platform, wherein the benchmark program and the image of the computing system are provided by a same entity, and wherein the image of the computing system comprises virtual computer hardware and a guest operating system used by the first computer application program;
     execute the benchmark program on the second virtual machine to measure a performance level of a second computer application program, the second virtual machine to run on a second hardware platform, wherein the second hardware platform comprises a different configuration of hardware components than the first hardware platform resulting in a variation in computing performance between the first and second hardware platforms, and wherein the benchmark program is executed on the first and second virtual machines to simulate a workload on the first and second computer application programs and to measure the performance levels of the first and second computer application programs in response to the workload in parallel;
     compare the performance levels of the first and second computer application programs, wherein an effect of the variation in computing performance between the first and second hardware platforms on the performance levels of the first and second computer application programs is reduced by the first and second virtual machines; and
     provide a result of the comparing through a user interface, the result to indicate the performance levels of the first and second computer application programs.

6. The system of claim 5, wherein the first and second computer application programs are provided by different entities.

7. The system of claim 5, wherein the performance is measured by a number of transactions performed in a given period of time.

8. The system of claim 5, wherein the workload is applied to the first and second computer application programs sequentially.

9. A non-transitory machine-readable storage medium storing instructions which, when executed, cause a processing device to:

generate, by the processing device, a first virtual machine from an image of a computing system;
generate, by the processing device, a second virtual machine from the image of the computing system;
execute a benchmark program on the first virtual machine to measure a performance level of a first computer application program, the first virtual machine to run on a first hardware platform, wherein the benchmark program and the image of the computing system are provided by a same entity, and wherein the image of the computing system comprises virtual computer hardware and a guest operating system used by the first computer application program;
execute the benchmark program on the second virtual machine to measure a performance level of a second computer application program, the second virtual machine to run on a second hardware platform, wherein the second hardware platform comprises a different configuration of hardware components than the first hardware platform resulting in a variation in computing performance between the first and second hardware platforms, and wherein the benchmark program is executed on the first and second virtual machines to simulate a workload on the first and second computer application programs and to measure the performance levels of the first and second computer application programs in response to the workload in parallel;
compare the performance levels of the first and second computer application programs, wherein an effect of the variation in computing performance between the first and second hardware platforms on the performance levels of the first and second computer application programs is reduced by the first and second virtual machines; and
provide a result of the comparing through a user interface, the result to indicate the performance levels of the first and second computer application programs.

10. The non-transitory machine-readable storage medium of claim 9, wherein the first and second computer application programs are provided by different entities.

11. The non-transitory machine-readable storage medium of claim 9, wherein the performance is measured by a number of transactions performed in a given period of time.

12. The non-transitory machine-readable storage medium of claim 9, wherein the workload is applied to the first and second computer application programs sequentially.

* * * * *